June 14, 1960     W. H. DU SHANE     2,940,530
DRAFT LOAD CONTROL FOR TRACTORS
Original Filed June 6, 1955     2 Sheets-Sheet 1
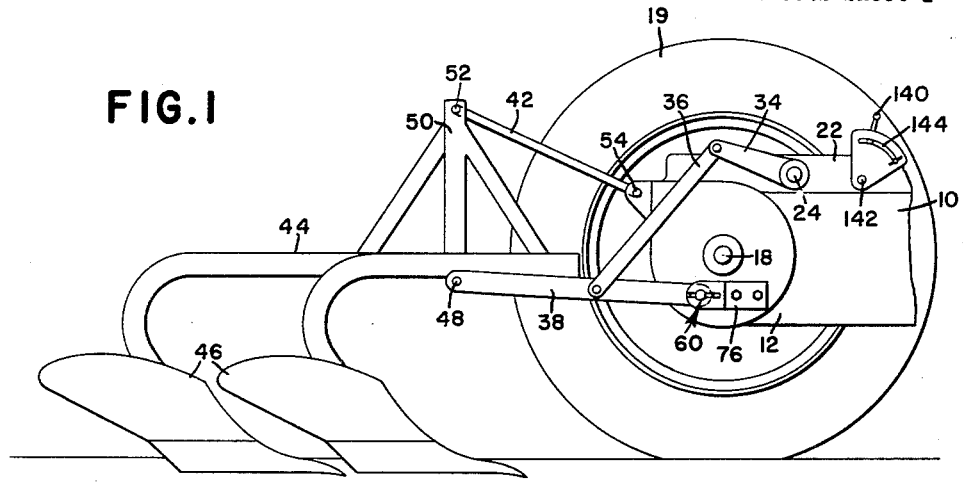
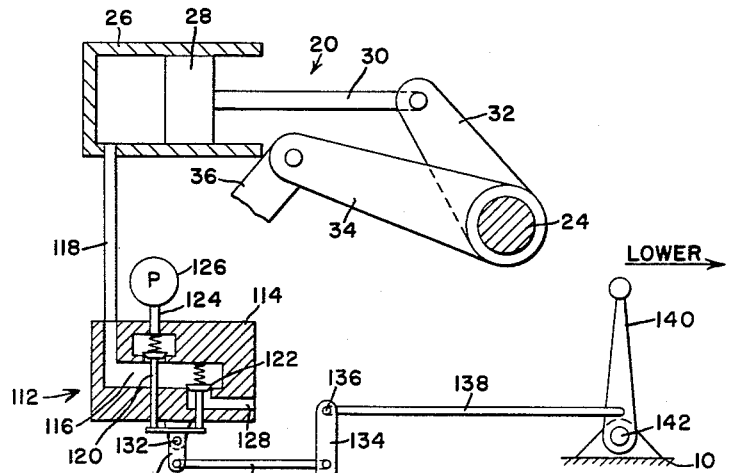
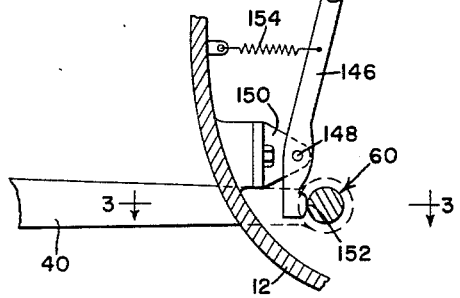
*INVENTOR.*
W. H. DuSHANE June 14, 1960     W. H. DU SHANE     2,940,530
DRAFT LOAD CONTROL FOR TRACTORS Original Filed June 6, 1955     2 Sheets-Sheet 2

INVENTOR.
W. H. DuSHANE

# United States Patent Office 2,940,530
Patented June 14, 1960

2,940,530
DRAFT LOAD CONTROL FOR TRACTORS

Wallace H. Du Shane, Waterloo, Iowa, assignor, by mesne assignments, to Deere & Company, a corporation of Delaware Continuation of abandoned application Ser. No. 513,352, June 6, 1955. This application Apr. 16, 1958, Ser. No. 730,743

20 Claims. (Cl. 172—7)

This invention relates to a draft control system for an agricultural tractor and features improvements in the conventional type of draft load control system in which the draft load is balanced against a yielding means in the form of a compression spring and which system includes a power adjusting mechanism actuated by variations in draft load so as to adjust the working depth of the implement so as to maintain a constant draft load.

This application is a continuation of copending application, Serial No. 513,352, filed June 6, 1955, now abandoned.

A system of the general character referred to above is shown basically in the U.S. patent to Ferguson 1,687,719, wherein variations in normal draft load operate mechanical means for adjusting the working depth of the implement. In the recent past, hydraulic power means has been substituted for the mechanical means of the Ferguson patent, with the usual advantages attendant upon the use of hydraulic circuits. In the present case, reference will be had to the improved system as used with hydraulic control means, but such reference is representative only.

As further representative of the environment in which the invention finds particular utility, there is disclosed here a tractor and plow, the plow being typical of an implement in which draft loads between the tractor and implement are caused to vary by such variables as soil density, wheel slippage, etc. Balance of draft load or draft forces has heretofore been achieved by the use of a coiled compression spring operating to resist compressive forces in a top link between the tractor and the implement. It has been found that a compression spring of the character noted leaves much to be desired in the way of sensitivity and economy and according to the present invention the coil spring is replaced by a simple bar adapted to be stressed in bending so that a portion thereof will be deflected and will be returned to normal in response to variations in draft load. The invention features the use of a bar preferably disposed transverse to the line of advance and having opposite end portions to which the lower draft links of the draft system are pivotally connected. With this arrangement, tension in the lower draft links applies bending loads to the bar, and the bar is supported on the tractor by spaced apart fulcra so that a midportion of the bar will deflect and will return to normal in response to variations in the bending stresses. A signal member is engaged by or at a midportion of the bar and picks up a signal as the bar deflects and returns to normal, this signal being transmitted in conventional fashion, if desired, to the power adjusting means on the tractor, whereby such means is activated or deactivated as the case may be so as to vary the working depth of the implement.

The invention features the provision of means for varying the moment acting on the bar, whereby each of the draft links or its equivalent element may be adjusted closer to or farther from its associated fulcrum. Another object of the invention is to provide simple mounting means for the bar which includes means for limiting bending of the bar, means for preventing rotation of the bar about its axis, and adjustable spacer means for accommodating variations in spacing of the draft link elements lengthwise of the bar. In a modified form of the invention, the principles are utilized in conjunction with the compressive forces in the top link of the draft connection.

It has further been determined that in the use of extremely long implements, such as four-bottom plows, the draft linkage actually functions with compression in the lower links. According to the present invention, the deflection of the bar in bending accommodates this phenomenon.

The foregoing and other important objects and desirable features inherent in and encompassed by the invention will become apparent as preferred embodiments of the invention are disclosed in detail in the following specification and accompanying sheets of drawings, the several figures of which are described immediately below.

Fig. 1 is a fragmentary side elevational view of the rear portion of a tractor and associated implement.

Fig. 2 is a schematic view, partly in section, showing the power adjusting means, the actuating means therefor, the signal member and the bar in bending.

Figure 7:
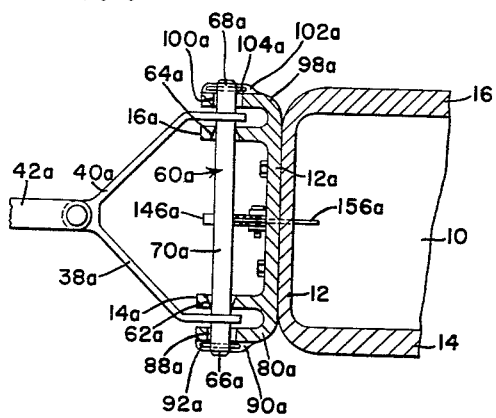
Fig. 7 is a sectional view as seen on the line 7—7 of Fig. 6.

The environment chosen for the purposes of illustration includes a typical agricultural tractor having a fore-and-aft body 10, the rear portion of which comprises a lubricant-containing housing 12 having opposite laterally spaced apart upright side walls 14 and 16 from each of which extends a laterally outwardly projecting axle for mounting a traction wheel. The right-hand axle appears at 18 and the left-hand traction wheel appears at 19 in Fig. 1. The expressions "right-hand" and "left-hand" are used with reference to the position of an observer standing behind the tractor and looking forwardly.

The tractor includes as a component part thereof a power-adjusting means 20 (Fig. 2) the basic components of which are contained in a secondary housing 22 in which is journaled a transverse rock shaft 24. The interior of the secondary housing 22 includes a cylinder 26 whithin which is a piston 28 that is rod-connected at 30 to an interior arm 32 fixed to the rock shaft 24. A pair of external arms, only one of which appears at 34, are secured respectively to opposite outer ends of the rock shaft 24. Each lift arm 34 is connected by a lift link 36 to a lower draft link element 38, which element is part of draft means including a second lower draft link element 40 and a single top link 42 for effecting a draft connection between the tractor and a trailing implement, which implement is shown here as comprising a plow having a frame 44 and a pair of plow bottoms 46.

Each lower draft link is pivotally connected on a transverse axis at 48 to the plow beam 44 and the plow has a rigid mast 50 to the upper end of which a pivotal connection is effected at 52 with the rear end of the top link 42. The forward end of the top link is, in that form of the invention shown in Figs. 1 through 5, pivotally connected at 54 to a rear part of the tractor housing 12. The forward ends of the draft links 38 and 40 are respectively apertured in transverse alinement at 56 and 58 (Figs. 3 and 4) for pivotal connection to a lower portion of the tractor body housing 12 by means of a transverse, elongated inherently resilient bar 60.

The bar 60, in addition to affording a pivotal support for the draft links 38 and 40, serves also as draft load control means for effecting activation and deactivation of the power adjusting means 20, which details will be brought out below. The present description will pertain to the mounting of the bar 20 on the tractor.

Figure 3:
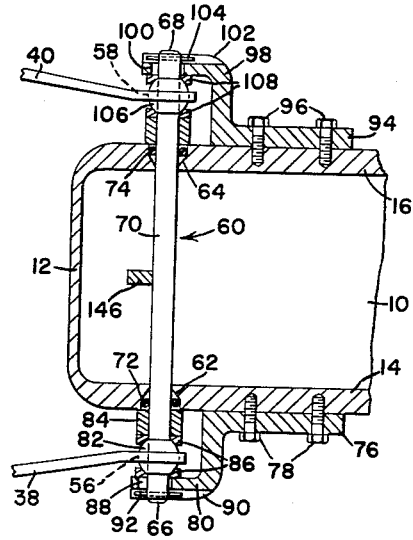
Fig. 3 is a fragmentary sectional view as seen substantially along the line 3—3 of Fig. 2.
Figure 4:
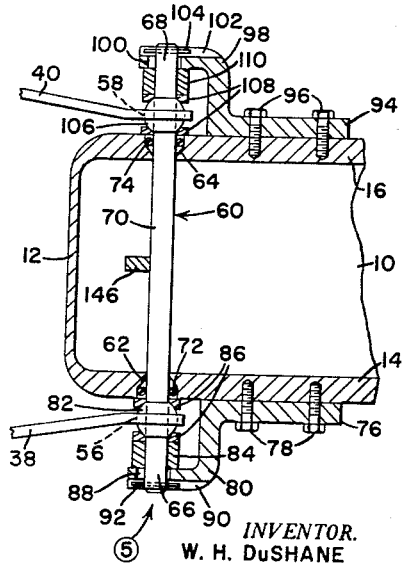
Fig. 4 is a view similar to Fig. 3 but showing a different spacing between the draft link elements.
Figure 5:
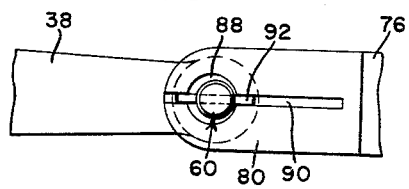
Fig. 5 is an enlarged end elevational view as seen in the direction of the arrow bearing the encircled numeral 5 in Fig. 4.

The rear part of the tractor body housing 12, and allied components to be presently described, affords a support for the bar 60. As best shown in Figs. 3 and 4, the side walls 14 and 16 are respectively apertured in alinement at 62 and 64, the apertured portions of the side walls serving as fulcra beyond which end portions 66 and 68, respectively, of the bar project laterally outwardly, a midportion 70 of the bar being, of course, disposed between the fulcra 62 and 64. The apertures 62 and 64 are shaped as shown to permit deflection of the bar when the bar is stressed in bending, which will occur when draft loads are applied to the bar via the draft link elements 38 and 40. Since the housing 12 is adapted to contain lubricant for the final drive mechanism (not shown) of the tractor, the apertures 62 and 64 respectively contain lubricant and contaminant seals 72 and 74.

The right-hand side wall 14 carries an external bracket 76, which is removably affixed to the side wall as by cap screws 78. This bracket includes a portion 80 in transverse alinement with the end portion 66 of the bar 60 and spaced laterally outwardly from the proximate side wall 14 so as to afford a space within which the apertured front end 56 of the draft link 38 is received by means of a spherical member 82 on the bar 60. The space between the bracket portion 80 and the side wall 14 is greater than the axial dimension of the spherical member 82 and this additional space is occupied by a spacer means 84 and a pair of thrust washers 86.

The outer bracket portion 80 thus confines the assembly 82—84—86, together with the front end of the draft link, against axial displacement. In addition to that, the portion 80 serves two other functions. For the first of these, the portion 80 has therein a slot 88 elongated in a fore-and-aft direction, or in opposite directions normal to the length of the bar 60. The slot is closed at opposite ends and therefore affords stop means limiting bending of the end portion 66 of the bar in either a rearwardly or a forwardly direction. The other function of the portion 80 evolves from the provision therein of a fore-and-aft groove 90 which receives a locking pin 92 passed diametrically through the bar end portion 66. Cooperation between the pin 92 and the groove 90 affords means for preventing angular movement of the bar 60 about its axis, which is important in maintaining the axis of the bar, since it is a practical impossibility to manufacture or otherwise maintain the bar true to its own axis. The groove 90 is preferably made as long as it is shown so that the pin 92 may be driven out in either direction for effecting removal of the bar.

The opposite wall 16 carries thereon a bracket 94 which is symmetrical as respects the bracket 76. Cap screws 96 serve to hold the bracket 94 in place and an outer bracket portion 98 has therein an elongated slot 100 which cooperates with the bar end portion 68 in the same manner that the bracket portion 80 cooperates with the opposite bar end portion 66. The closed ends of the slot 100, like those of the slot 88, afford stop means for limiting fore-and-after movement of the end portion 68. A groove 102 in the bracket portion 98 accommodates a bar-carried diametrical pin 104 for assisting in preventing angular movement of the bar about its axis, as well as cooperating with the pin 92 in holding the axial position of the bar 60 relative to the support afforded by the tractor body housing 12.

The forward apertured end 58 of the left hand draft link 40 includes a spherical member 106 with which are cooperatively related a pair of thrust washers 108 and a spacer means 110.

Figs. 3 and 4 illustrate that the lateral spacing between the draft link elements 38 and 40 may be varied by interchanging the positions of the spacers 84 and 110. This is important from the standpoint of utilizing different implements with the same tractor. For example, in some implements, it is necessary that draft links corresponding to those at 38 and 40 be spaced farther apart at some times than at others. Interchangeability of the spacer means positions may be readily accomplished as, for example, by removing the cap screws 78 and 96 to initiate the removal of the brackets and interchanging procedure, after which the parts may be restored to normal positions, the only difference being that in one case the spacers will be inwardly of the draft link balls and in the other case the spacers will be outwardly of the draft link balls. Since draft loads applied to the bar 60 to stress the bar in bending are applied respectively at the outer end portions 66 and 68, the moment at each side of the midportion will, of course, be varied according to the axial distance between the midpoint and the connection of the draft links 38 and 40. The tapered shapes of the apertures 62 and 64 permit rearward deflection, for example, of the outer end portions, accompanied by forward deflection of the midportion 70 of the bar, which will occur in the event of the application of tensional forces or loads to the draft links. In those cases in which compression loads are applied to the draft links, the outer end portions 66 and 68 of the bar will be deflected forwardly and the midportion 70 will consequently be deflected rearwardly. Of course, the inherently resilient bar is capable of deflection and of returning to its normal position. The bar is designed for little or no deflection under light or normal draft loads, but is adequately sensitive for the purposes desired, as will be brought out below.

The signal picked up from or transmitted by the deflection and return to normal of the midportion 70 of the bar 60 is used to control the power adjusting means 20 through the medium of actuating means 112. This means comprises a valve housing 114 included in or as part of either the tractor housing 12 or the auxiliary housing 22. As shown schematically in Fig. 2, the housing 114 has an internal chamber 116 connected to the cylinder 26 by a conduit 118 and controlled by a high-pressure poppet valve 120 and an exhaust poppet valve 122 for respectively controlling a supply line 124 from a pump 126 and an exhaust or reservoir line 128. The poppet valves are respectively spring loaded to normal closed positions to hydraulically lock the cylinder 26. The fluid pressure system as shown is of the constant pressure type, but any other type could be employed.

A valve controlling member 130 is pivoted at 132 to the valve housing 114 and engages the stems of the poppet valves 120 and 122. Rocking of the member 130 in one direction will open one valve while the other valve remains closed. Control of the member 130 is effected by a link 132' that is pivotally connected intermediate the ends of a lever 134. The upper end of this lever is pivotally connected at 136 to a link 138 that extends forwardly to a hand control lever 140. The hand lever is fulcrumed at 142 on a convenient portion of the secondary housing 22 and has associated therewith a conventional arcuately slotted sector 144. As is typical of arrangements of this type, there is sufficient friction between the hand lever 140 and the sector 144 to maintain any selected position of the hand lever.

The transmission of signals from the bar 60 to the actuating means 112 is effected by a signal member 146, fulcrumed intermediate its ends at 148 to a suitable support 150 on a rear wall of the tractor body housing 12. The lower end of the signal member 146, as at 152, is in constant engagement with the midportion 70 of the bar 60, a tension spring 154 being connected between the signal member 146 and the rear wall of the housing 12 to maintain this engagement. The upper end of the signal member is pivotally connected at 156 to the lower end of the lever 134.

Operation (Figs. 1–5)

As seen in Fig. 2, both poppet valves 120 and 122 are closed. Hence, the hydraulic system is locked and the position of the rock shaft 24 is fixed. Since the draft linkage 38—40—42 is connected to the rock shaft 24 via the arms 34, the position of the implement will be fixed. When it is desired to lower the implement into the ground, the hand lever 140 is moved forwardly, exerting a tensional force through the link 138 on the upper end of the lever 134. During this phase of the operation, the signal member 146 will be fixed; hence, the pivot at 156 will be the fulcrum for forward or clockwise swinging of the lever 134. This movement of the lever 134 causes a forward pull on the link 132′, resulting in rocking of the valve-operating member 130 about its pivot 132, causing the exhaust poppet valve 122 to be lifted from its seat in the valve chamber 116. Thereupon, fluid may flow from the cylinder 26 to the exhaust line 128 via the line 118 and chamber 116.

As the tractor and implement move forwardly, the plow bottoms 46 will enter the ground and will ultimately impose on the tractor via the draft links 38 and 40 a draft force that will be balanced against the inherently resilient bar 60. If it be assumed that the draft force is measured in tensional load, there will be a rearwardly applied force acting through the draft links 38 and 40 onto the outer ends 66 and 68 of the bar 60, causing the midportion 70 of the bar to be deflected forwardly. As this forward deflection occurs, the spring 154 causes the signal member to pivot in a counterclockwise direction, thereby effecting clockwise swinging of the lever 134 about the pivot 136 as a fulcrum, since the position of the hand lever 140 is fixed. This action reverses the previous movement of the valve operator 130 through the link 132′, restoring the valve operator to its original position and allowing the exhaust check valve 122 to be returned to its closed position by its closing spring. The system is again hydraulically locked and will remain so as long as the draft force remains normal or until the position of the hand lever 140 is changed, all in accordance with the usual operation of a system of this character. In the event that the draft force exceeds the normal value, the midportion 70 of the bar 60 will be deflected farther forwardly, causing further counterclockwise swinging of the signal member 146, resulting in opening of the high pressure poppet valve 120 and the consequent supply of fluid under pressure to the cylinder 26, effecting forward movement of the piston 28 and clockwise rocking of the rockshaft 24 to raise the implement to a new operating depth. As will be seen, in the event that the forces in the draft links 38 and 40 are in compression rather than in tension, the outer ends 66 and 68 of the bar 60 will be deflected forwardly, causing a rearward deflection of the midportion 70 of the bar. This will be followed by clockwise swinging of the signal member 146 and counterclockwise swinging of the lever 134 about the pivot 136 as a fulcrum. This action results in opening the exhaust poppet valve 122 to permit the exhaust of fluid from the cylinder 26 so that the implement may assume a deeper working position.

One of the principal advantages of the bar 60, which is stressed in bending as already described, is that it is extremely economical. Moreover, it measures the draft force in both draft links 38 and 40, being capable of measuring a plus value in one and a minus value in the other, as well as plus or minus values in both. Although the bar is adequately sensitive to normal variations in draft load, it is capable of accepting shock loads without causing the signal member 146 to respond, since the bar 60 is readily capable of returning to its normal position rather quickly. The bar is preferably of high-carbon steel, with carbon in the .30–.90% range.

The rear ends of the slots 88 and 100, respectively in the outer or external brackets 76 and 94, limit rearward deflection of the respective outer end portions. These are designed to be contacted by the end portions of the bar under maximum draft load. Shock loading of the implement thereafter will have no further effect on bending of the bar 60. The same is true in a more limited sense when the draft links 38 and 40 are reflecting minus values, it being noted that the slots 88 and 110 are elongated farther rearwardly than they are forwardly.

Figs. 6 and 7

In this form of the invention, the principles previously described are utilized in connection with a top link element 42a, the lower draft links 38 and 40 being simply pivoted to the tractor body housing 12 as by a transverse pivot 158. Other components of the tractor, such as the power adjusting means 20 and the actuating means 112 exist as previously described.

Figure 6:
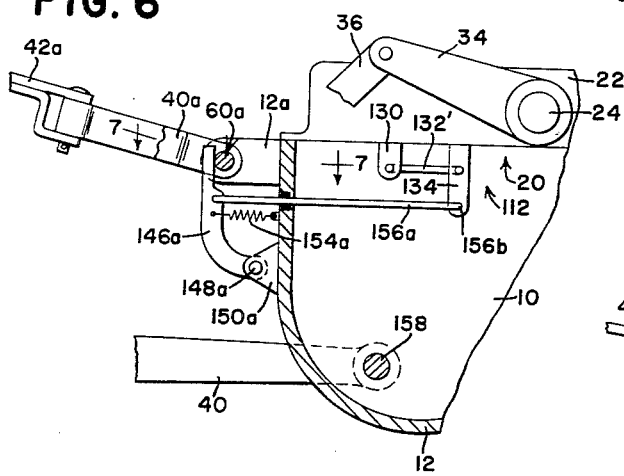
Fig. 6 is a schematic view, partly in section, of that form of the invention in which the bar is used in conjunction with the top link of the draft means.

The tractor body housing 12 rigidly carries at a rear upper portion thereof a support 12a for supporting an elongated inherently resilient bar 60a that is similar in all respects to the bar 60 previously described. For the purposes of convenience, the same reference characters, suffixed by the letter a will be used. To this end, the support 12a has laterally spaced apart portions 14a and 16a that are respectively apertured at 62a and 64a, plus outer portions 80a and 98a that respectively have elongated slots 88a and 100a. Pin and groove means 92a—90a and 104a—102a prevent angular movement of the bar 60a. The bar has opposite outer end portions 66a and 68a as well as a midportion 70a. The support portions 14a and 80a are spaced apart to receive a right-hand laterally offset leg 38a of the top link 42a. This top link has an offset left-hand leg 40a received between the support portions 16a and 98a. Consequently, the top link is adapted to apply draft loads to the bar 60a to stress the bar in bending, the midportion of the bar being deflected and cooperative with a signal member 146a that is in constant engagement therewith. The signal member is pivoted at 148a on a suitable external bracket 150a and is biased by a spring 154a into engagement with the rear side of the bar 60a. A link 156a extends forwardly from the upper portion of the signal member 146a and has a pivotal connection at 156b with the lever 134. Also recognizable in Fig. 6 are the valve operator 130 and valve operator link 132′. The substantial identity between the two forms of the invention will be readily recognized, as will be operational characteristics thereof. Hence, it is deemed that further description is unnecessary.

The advantages of the bar 60 apply also to the bar 60a.

Various other features of the invention, not categorically enumerated herein, will undoubtedly occur to those skilled in the art, as will many modifications and alterations in the preferred forms of the invention shown, all of which may be achieved without departing from the spirit and scope of the invention.

What is claimed is:

1. For a tractor having power adjusting means for effecting the adjustment of an associated implement and actuating means for selectively activating and deactivating the power adjusting means: draft load control means comprising a support on the tractor; an inherently resilient bar carried by the support for temporary deflection from normal when stressed in bending; a movable signal member operatively connected to the actuating means and engaging the bar; and implement-connectible draft means connected to the bar for stressing the bar in bending in response to implement draft loads so as to deflect the bar and incur movement of the signal member and consequent activation of the power adjusting means.

2. The invention defined in claim 1, including: stop means carried by the tractor and normally spaced from the bar and engageable by the bar under bending loads for limiting deflection of the bar.

3. The invention defined in claim 1, including: means engaged between the bar and the support for preventing angular movement of the bar about its axis.

4. The invention defined in claim 1, including: a support portion fixed to said support and having a bar-receiving slot elongated in a direction parallel to deflection to the bar in bending, said slot being closed at opposite ends to afford spaced stops limiting bending of the bar in both directions lengthwise of the slot.

5. A tractor and implement arrangement including a draft connection between the tractor and implement, yielding means in the draft connection and acting against the draft and balancing the normal draft, power lift means on the tractor for regulating the working depth of the implement, and actuating means for the power lift means actuated by relative movement between the implement and tractor in a fore-and-aft direction in response to variations in said normal draft to cause the power lift means to correct the working depth of the implement, characterized in that the yielding means comprises an inherently resilient bar stressed in bending by variations in said normal draft.

6. For a tractor having power adjusting means for effecting the adjustment of an associated implement and actuating means for selectively activating and deactivating the power adjusting means: draft load control means comprising an elongated inherently resilient bar having opposite end portions and a midportion; a support mounting the bar on the tractor, including a pair of fulcra spaced apart lengthwise of the bar and engaging the bar respectively short of its end portions so that implement loads applied to the end portions of the bar in directions transverse to the length of the bar will stress the bar in bending to cause temporary deflection of the midportion of the bar; a signal member operatively connected to the actuating means and engaging the midportion of the bar to be moved by said midportion upon deflections thereof; and implement-connectible draft means having a pair of bar-engaging elements spaced apart lengthwise of and respectively engaging the end portions of the bar for stressing the bar in bending in response to draft loads so as to deflect said midportion and incur movement of the signal member and consequent activation of the power adjusting means.

7. The invention defined in claim 6, including: a pair of stop members on the support spaced respectively outwardly of the fulcra and engageable respectively with the end portions of the bar to limit bending of the bar.

8. The invention defined in claim 7, including: means engaged between one end portion of the bar and the proximate stop member for preventing angular movement of the bar about its axis.

9. The invention defined in claim 7, in which: each stop member is in the form of an ear having therein a slot receiving and elongated in the direction of movement of the proximate end portion, said slot being closed at opposite ends to afford spaced stops limiting bending of the bar in both directions.

10. The invention defined in claim 6, including: a pair of spacer means, each selectively positionable between a draft means element and the proximate fulcrum to vary the moment of the draft means element on the bar.

11. For a tractor having a rear housing including laterally spaced opposite side walls and carrying a power adjusting means for effecting the adjustment of an associated implement, and actuating means disposed between the side walls for selectively activating and deactivating the power adjusting means: the combination therewith of draft load control means comprising an elongated inherently resilient bar positioned with its length transverse to the tractor housing and the housing side walls being apertured in transverse alinement to receive the bar, said bar having opposite end portions projecting laterally respectively beyond the side walls and a midportion between said side walls, said side walls respectively affording spaced fulcra for the bar so that implement loads applied to the end portions of the bar in directions transverse to the length of the bar will stress the bar in bending to cause temporary deflection of the midportion of the bar; a movable signal member supported within the housing and operatively connected to the actuating means, said signal member engaging the midportion of the bar to be moved by said midportion upon deflection thereof; and implement-connectible draft means externally of the housing and having a pair of laterally spaced draft-load-responsive elements respectively engaging the end portions of the bar for stressing the bar in bending so as to deflect the midportion of the bar and incur movement of the signal member and consequent activation of the power adjusting means.

12. The invention defined in claim 11, including: a pair of external brackets, one secured to each side wall in laterally outwardly spaced relation thereto and alined with the respective end portion of the bar and confining the proximate draft means element against displacement lengthwise of the bar.

13. For a tractor having a rear housing including laterally spaced opposite side walls and carrying a power adjusting means for effecting the adjustment of an associated implement, and actuating means disposed between the side walls for selectively activating and deactivating the power adjusting means: the combination therewith of draft load control means comprising an elongated inherently resilient bar positioned with its length transverse to the tractor housing and the housing side walls being apertured in transverse alinement to receive the bar, said bar having opposite end portions projecting laterally respectively beyond the side walls and a midportion between said side walls, said side walls respectively affording spaced fulcra for the bar so that implement loads applied to the end portions of the bar in directions transverse to the length of the bar will stress the bar in bending to cause temporary deflection of the midportion of the bar; a movable signal member supported within the housing and operatively connected to the actuating means, said signal member engaging the midportion of the bar to be moved by said midportion upon deflection thereof; implement-connectible draft means externally of the housing and including a pair of laterally spaced apart elements respectively apertured in transverse alinement to respectively be received by the bar end portions; and a pair of external brackets, one secured to each side wall in laterally outwardly spaced relation thereto and in alinement with the bar, each draft means element being received between the respective side wall and bracket.

14. The invention defined in claim 13, in which: the draft means elements are laterally adjustable relative to each other to enable variations in the lateral spacing therebetween; each end portion of the bar is sufficiently long and each bracket is spaced outwardly from the respective side wall a sufficient distance to accommodate variations in spacing between said elements; and each end portion of the bar has spacer means selectively positionable between the respective side wall and draft means element or between the respective bracket and element to maintain the selected spacing between the elements.

15. For a tractor having a lubricant-containing rear housing including laterally spaced opposite side walls and carrying a power adjusting means for effecting the adjustment of an associated implement, and actuating means disposed between the side walls for selectively activating and deactivating the power adjusting means: the combination therewith of draft load control means comprising an elongated inherently resilient bar positioned with its length transverse to the tractor housing each side wall having an aperture therein and said apertures being in transverse alinement to receive the bar, said bar having opposite end portions projecting laterally respectively beyond the side walls and a midportion between said side walls, said side walls respectively affording spaced fulcra for the bar so that implement loads applied to the end portions of the bar in directions transverse to the length of the bar will stress the bar in bending to cause temporary deflection of the midportion of the bar; a lubricant seal in each aperture and encircling the proximate portion of the bar; a movable signal member supported within the housing and operatively connected to the actuating means, said signal member engaging the midportion of the bar to be moved by said midportion upon deflection thereof; and implement-connectible draft means externally of the housing and having a pair of laterally spaced draft-load-responsive elements respectively engaging the end portions of the bar for stressing the bar in bending so as to deflect the midportion of the bar and incur movement of the signal member and consequent activation of the power adjusting means.

16. For a tractor having power adjusting means for effecting the adjustment of an associated implement and actuating means for selectively activating and deactivating the power adjusting means: draft load control means comprising a pair of supports on the tractor and spaced apart transversely to the fore-and-aft centerline of the tractor; elongated resilient means disposed transversely to said centerline and having opposite end portions carried respectively by said supports and further having an intermediate portion between said supports; a movable signal member operatively connected to the actuating means and engageable with the intermediate portion of the resilient means; and implement-connectible draft means connected to the end portions of said resilient means for deflecting said end portions in one direction transverse to the length of said resilient means and thereby to incur deflection of said intermediate portion in the opposite direction.

17. For a tractor having power adjusting means for effecting the adjustment of an associated implement and actuating means for selectively activating and deactivating the power adjusting means: draft load control means comprising fulcrum means on the tractor; means operative as a lever disposed transversely to the fore-and-aft centerline of the tractor and fulcrumed on said fulcrum means, said lever means having first and second portions respectively at opposite sides of said fulcrum means; said lever means including means yieldingly resisting deflection of said first and second portions respectively in opposite directions; a movable signal member operatively connected to the actuating means and engageable with the first portion of the lever means; and implement-connectible draft means connected to the second portion of said lever means for deflecting said second portion in one direction transverse to the length of said lever means and thereby to incur deflection of said first portion in the opposite direction.

18. For a tractor having power adjusting means for an associated implement and actuating means for activating and deactivating the power adjusting means: draft means comprising an elongated inherently resilient beam having opposite-implement-connectible end portions receivable of draft load from an implement; support means mounting the beam on the tractor and including a pair of tractor-carried fulcrum elements spaced apart lengthwise of the beam and normally engaging the beam respectively at points of the beam end portions so that said end portions respectively overhang said points for deflection relative to said points when the beam is stressed in bending by draft load applied thereto; and signal means operative in response to such deflection and effective on the actuating means to incur activation of the power adjusting means.

19. For a tractor having power adjusting means for effecting the adjustment of an associated implement and actuating means for selectively activating and deactivating the power adjusting means; draft load control means comprising support means connected to the tractor; an inherently resilient bar connected to the support for temporary deflection from normal when stressed in bending; implement-connectible draft means connected to the bar for stressing the bar in bending in response to implement draft loads so as to deflect the bar from normal; and signal means operative in response to deflection of the bar and effective on the actuating means to incur activation of the power adjusting means.

20. For a tractor having power adjusting means for effecting the adjustment of an associated implement and actuating means for selectively activating and deactivating the power adjusting means; draft load control means comprising support means connected to the tractor; an inherently resilient bar connected to the support for temporary deflection from normal when stressed by load applied thereto in spaced relation to the support means; implement-connectible draft means connected to the bar for stressing the bar as aforesaid in response to implement draft loads so as to deflect the bar from normal; and signal means operative in response to deflection of the bar and effective on the actuating means to incur activation of the power adjusting means.

References Cited in the file of this patent
UNITED STATES PATENTS
2,724,314　Evans ＿＿＿＿＿＿＿＿＿＿＿＿＿ Nov. 22, 1955